US009585180B2

(12) United States Patent
Pieda et al.

(10) Patent No.: US 9,585,180 B2
(45) Date of Patent: Feb. 28, 2017

(54) COMMUNICATION DEVICE, METHOD AND SYSTEM FOR ESTABLISHING WIRELESS PEER-TO-PEER CONNECTIONS

(71) Applicant: BLACKBERRY LIMITED, Waterloo (CA)

(72) Inventors: Peter Steven Pieda, Ottawa (CA); Michael Peter Montemurro, Toronto (CA)

(73) Assignee: BLACKBERRY LIMITED, Waterloo, Ontario (CA)

( * ) Notice: Subject to any disclaimer, the term of this patent is extended or adjusted under 35 U.S.C. 154(b) by 142 days.

(21) Appl. No.: 14/528,109

(22) Filed: Oct. 30, 2014

(65) Prior Publication Data

US 2016/0128111 A1    May 5, 2016

(51) Int. Cl.
H04W 76/02    (2009.01)
H04W 28/02    (2009.01)
(Continued)

(52) U.S. Cl.
CPC ........ *H04W 76/023* (2013.01); *H04L 67/1051* (2013.01); *H04L 69/24* (2013.01);
(Continued)

(58) Field of Classification Search
None
See application file for complete search history.

(56) References Cited

U.S. PATENT DOCUMENTS

| 2011/0225305 | A1 | 9/2011 | Vedantham et al. | |
| 2011/0282989 | A1* | 11/2011 | Geirhofer | H04W 28/18 709/224 |

(Continued)

FOREIGN PATENT DOCUMENTS

EP    2688319 A1    1/2014

OTHER PUBLICATIONS

Arash Asadi et al: "Wi Fi Direct and LTE D2D in action",2013 IFIP Wireless Days (WD),Nov. 1, 2013 (Nov. 1, 2013), pp. 1-8,XP55186549, DOI: 10.1109/WD.2013.6686520 ISBN: 978-1-47-990543-0 * p. 1, right-hand column, last paragraph * * page 2, left-hand column, paragraph 5  p. 2, right-hand column, paraaraph 4  p. 3, left-hand column, paragraph 2 *.

(Continued)

*Primary Examiner* — Kevin C Harper
*Assistant Examiner* — Derrick V Rose
(74) *Attorney, Agent, or Firm* — Perry + Currier, Inc.

(57) ABSTRACT

A communication device for establishing wireless peer-to-peer connections includes a network interface, a memory and a processor. The processor receives a command to initiate a wireless peer-to-peer connection with a second device, sets an intent parameter to a default value and stores the intent parameter in the memory. The processor determines whether a link has been established between the network interface and a wireless base station. When a link has been established, the processor adjusts the intent parameter based on a channel type of the link. The processor receives a second intent parameter from the second device via the network interface, and determines whether the intent parameter is greater than the second intent parameter. When the determination is affirmative, the processor configures the communication device as an access point for the peer-to-peer connection; and when the determination is negative, the processor configures the communication device as a client for the peer-to-peer connection.

17 Claims, 5 Drawing Sheets

(51) Int. Cl.
*H04W 72/04* (2009.01)
*H04W 8/00* (2009.01)
*H04W 84/20* (2009.01)
*H04L 29/08* (2006.01)
*H04L 29/06* (2006.01)

(52) U.S. Cl.
CPC ....... *H04W 8/005* (2013.01); *H04W 28/0289* (2013.01); *H04W 72/0486* (2013.01); *H04W 84/20* (2013.01)

(56) References Cited

U.S. PATENT DOCUMENTS

| | | | |
|---|---|---|---|
| 2012/0106452 A1 | 5/2012 | Kneckt et al. | |
| 2012/0166671 A1 | 6/2012 | Qi et al. | |
| 2012/0224569 A1* | 9/2012 | Kubota | H04W 84/20 370/338 |
| 2012/0233266 A1 | 9/2012 | Hassan et al. | |
| 2013/0040576 A1* | 2/2013 | Yoon | H04W 8/005 455/41.2 |
| 2013/0339504 A1* | 12/2013 | Montemurro | H04W 12/06 709/223 |
| 2016/0021586 A1* | 1/2016 | Akhi | H04W 36/06 370/229 |

OTHER PUBLICATIONS

Extended European Search Report dated Mar. 7, 2016 for European Patent Application No. 15191771.3.

* cited by examiner

COMMUNICATION DEVICE, METHOD AND SYSTEM FOR ESTABLISHING WIRELESS PEER-TO-PEER CONNECTIONS

FIELD

The specification relates generally to wireless peer-to-peer connections, and specifically to a communication device, method and system for establishing wireless peer-to-peer connections.

BACKGROUND

Wireless peer-to-peer connections, such as those established according to the Wi-Fi Direct standard, allow two or more devices (e.g. smart phones) to exchange data without the need for a central base station or access point. Instead, one of the devices takes on the role of access point, while the other device(s) take on the role of clients.

During the establishment of the connection, the devices can negotiate to select one device to act as an access point for the duration of the peer-to-peer connection. Conventionally, such a selection may be made at random. However, this may result in the selection of a device that is poorly suited to act as an access point due to the computational and communication resources available to that device.

BRIEF DESCRIPTIONS OF THE DRAWINGS

Embodiments are described with reference to the following figures, in which.

DETAILED DESCRIPTION OF THE EMBODIMENTS

Figure 1:
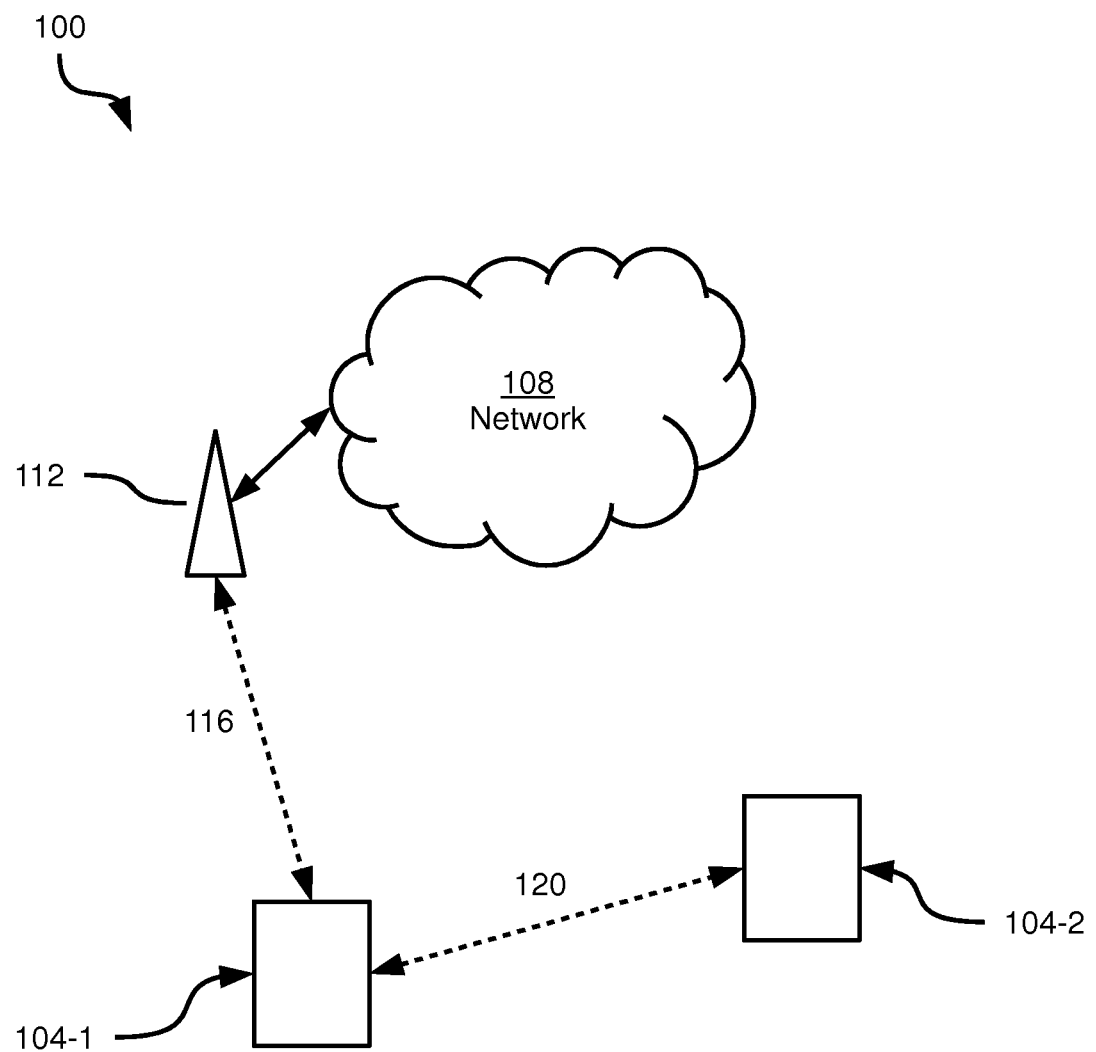
FIG. 1 depicts a communications system, according to a non-limiting embodiment.

According to an aspect of the specification, a communication device is provided, including: a network interface; a memory; a processor interconnected with the network interface and the memory, the processor configured to: receive a command to initiate a wireless peer-to-peer connection with a second communication device; set an intent parameter corresponding to the communication device to a default value, and store the intent parameter in the memory; determine whether a link has been established between the network interface and a wireless base station; when a link has been established, adjust the intent parameter based on a channel type of the link; receive a second intent parameter corresponding to the second communication device via the network interface; determine whether the intent parameter is greater than the second intent parameter; when the determination is affirmative, configure the communication device as an access point for the peer-to-peer connection; and when the determination is negative, configure the communication device as a client for the peer-to-peer connection.

According to another aspect of the specification, a method is provided in a computing device having a network interface, a memory and a processor. The method includes: receiving, at the processor, a command to initiate a wireless peer-to-peer connection with a second communication device; set an intent parameter corresponding to the communication device to a default value, and store the intent parameter in the memory; determine, at the processor, whether a link has been established between the network interface and a wireless base station; when a link has been established, adjust the intent parameter in the memory based on a channel type of the link; receive, at the processor, a second intent parameter corresponding to the second communication device via the network interface; determine, at the processor, whether the intent parameter is greater than the second intent parameter; when the determination is affirmative, configure the communication device as an access point for the peer-to-peer connection; and when the determination is negative, configure the communication device as a client for the peer-to-peer connection.

According to a further aspect of the specification, a non-transitory computer readable medium is provided storing a plurality of computer readable instructions executable by a processor of a communication device having a memory and a network interface interconnected with the processor, for performing a method including: receiving, at the processor, a command to initiate a wireless peer-to-peer connection with a second communication device; set an intent parameter corresponding to the communication device to a default value, and store the intent parameter in the memory; determine, at the processor, whether a link has been established between the network interface and a wireless base station; when a link has been established, adjust the intent parameter in the memory based on a channel type of the link; receive, at the processor, a second intent parameter corresponding to the second communication device via the network interface; determine, at the processor, whether the intent parameter is greater than the second intent parameter; when the determination is affirmative, configure the communication device as an access point for the peer-to-peer connection; and when the determination is negative, configure the communication device as a client for the peer-to-peer connection.

FIG. 1 depicts a communications system 100 including a plurality of communication devices. Two example communication devices 104-1 and 104-2 are illustrated, though a greater number of communication devices can be present in other embodiments. Each of mobile devices 104-1 and 104-2 can be any one of a cellular phone, a smart phone, a tablet computer, a laptop computer, and the like.

System 100 also includes a network 108, which can include any suitable combination of wired and/or wireless networks, including but not limited to a Wide Area Network (WAN) such as the Internet, a Local Area Network (LAN), cell phone networks, Wi-Fi networks, WiMax networks and the like. A wireless base station (which may also be referred to as a wireless access point or router) 112 is connected to network 108. Base station 112 can be any suitable base station, including a Wi-Fi base station, a mobile or cellular base station, and the like. In the present example, network 108 is the Internet and base station 112 is assumed to be a Wi-Fi base station establishing a wireless local area network connected to network 108.

Communication devices 104-1 and 104-2 can connect to network 108, for example via base station 112. In the example shown in FIG. 1, communication device 104-1 is connected to base station 112 via a wireless link 116. Communication device 104-2 may be capable of connecting to base station 112, but is not currently connected to base station 112 in the example shown in FIG. 1.

Additionally, communication devices 104-1 and 104-2 may establish a wireless peer-to-peer connection between each other over a link 120. Link 120 may be established according to the Wi-Fi Direct standard (as set out in the "Wi-Fi Peer-To-Peer (P2P) Technical Specification" as updated from time to time), for example, and devices 104-1 and 104-2 can exchange data over link 120, including file transfers, screencasting data and the like.

In order to establish the peer-to-peer connection over link 120, devices 104-1 and 104-2 are configured to exchange data and determine, based on that data, which device will act as the access point for the peer-to-peer connection, and which device (or devices, when more than two devices are present) will act as the client(s) for the peer-to-peer connection. As will be appreciated by those skilled in the art, in connections such as Wi-Fi Direct connections, to eliminate the need for a dedicated hardware access point such as base station 112, one of the devices participating in the peer-to-peer connection assumes the role of access point, and thus may perform actions such as enforcing security in the peer-to-peer connection (e.g. requesting passcodes for other devices attempting to join the peer-to-peer connection), and channel selection for the peer-to-peer connection.

In general, to make the above-mentioned selection of an access point from among the participating devices, each one of devices 104-1 and 104-2 is configured to generate and adjust an intent parameter indicating how suitable that particular device is to act as an access point for the peer-to-peer connection. As will be discussed in greater detail below, devices 104-1 and 104-2 are configured to adjust their respective intent parameters based on a variety of factors, including the channel type and congestion of any links between devices 104-1 and 104-2 and base station 112 (such as link 116 between device 104-1 and base station 112).

Before discussing the functionality of devices 104-1 and 104-2 in further detail, a description of certain internal components of communication device 104-1 will be provided. Communication device 104-2 can include similar internal components to those discussed below.

Figure 2:
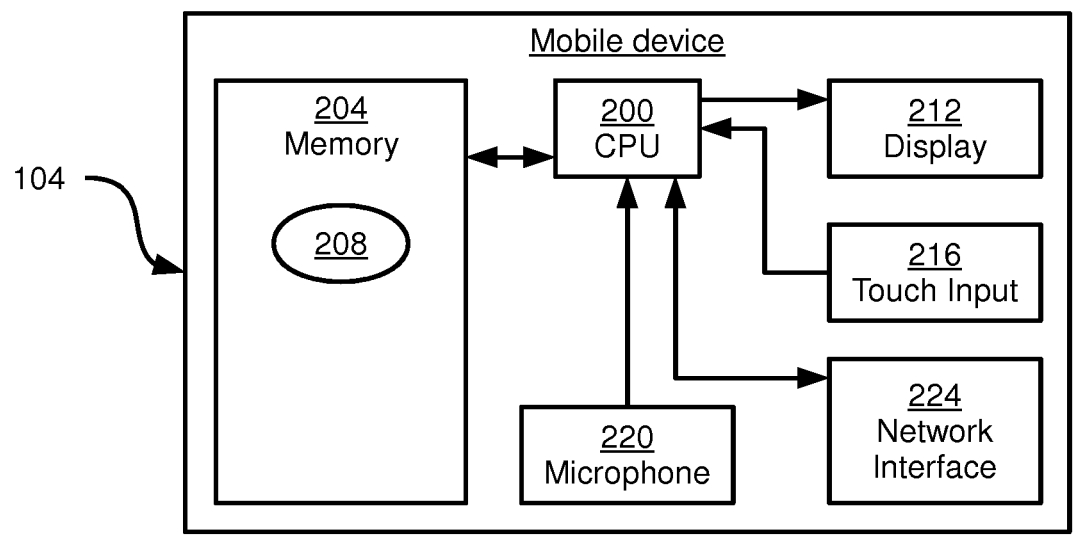
FIG. 2 depicts internal components of a communications device in the system of FIG. 1, according to a non-limiting embodiment.

Turning to FIG. 2, certain internal components of communication device 104-1 are illustrated. In particular, communication device 104-1 includes a central processing unit (CPU) 200, also referred to herein as processor 200, interconnected with a computer readable storage medium such as a memory 204. Memory 204 can include any suitable combination of volatile memory (e.g. random access memory (RAM)) and non-volatile memory (e.g. read only memory (ROM), Electrically Erasable Programmable Read Only Memory (EEPROM), flash memory, magnetic hard disc, or optical disc).

Memory 204 stores computer readable instructions executable by processor 200, including a peer-to-peer connection application 208, also referred to herein as application 208. It is contemplated that other computer readable instructions can also be stored in memory 204, including an operating system (indeed, in some examples, application 208 can be integrated with other applications, including the operating system).

Processor 200 and memory 204 are hardware elements, generally comprised of one or more integrated circuits (ICs), and can have a variety of structures, as will now occur to those skilled in the art (for example, more than one CPU can be provided). Processor 200 executes the instructions of application 208 to perform, in conjunction with the other components of communication device 104-1, various functions related to generation and adjustment of an intent parameter to establish a peer-to-peer connection with communication device 104-2. In the below discussion of those functions, communication device 104-1 is said to perform or implement those functions. It will be understood that communication device 104-1 is configured to perform those functions via the processing of the computer readable instructions in memory 204 (including those of application 208) by the hardware components of mobile computing device 104-1 (including processor 200). More particularly, processor 200 can be said to perform those functions by executing the instructions in memory 204.

Communication device 104-1 also includes a display 212 interconnected with processor 200. Display 212 includes one or more display panels based on any suitable panel technology (e.g. liquid crystal display (LCD), organic light emitting diode (OLED), and the like), and receives data for presentation on such panels from processor 200. In addition, communication device 104-1 includes a touch input device 216 interconnected with processor 200, for receiving input (e.g. from an operator of communication device 104-1) and providing data representing such input to processor 200. Touch input device 216 can include any suitable combination of buttons and keypads, touch screens integrated with display 212, and the like.

Communication device 104-1 can also include other input devices, such as a microphone 220 interconnected with processor 200. Microphone 220 detects sound from the environment of communication device 104-1 and provides data representing such sound to processor 200. Communication device 104-1 may also include other input devices (not shown), such as a camera, a GPS receiver, sensors such as light and motion sensors and the like.

Communication device 104-1 also includes a network interface 224 interconnected with processor 200, which allows communication device 104-1 to communicate with other devices, including communication device 104-2 (over link 120) and base station 112 (over link 116). Network interface 224 thus includes the necessary hardware, such as radio transmitter/receiver units, network interface controllers and the like, to communicate over the above-mentioned links.

The components of communication device 104-1 can be interconnected by one or more buses (not shown) and contained within a housing made of any suitable combination of materials (e.g. metals such as aluminum, plastics such as Acrylonitrile butadiene styrene (ABS), and the like). The components of communication device 104-1 can be powered by a battery within the housing, a wall socket, or a combination thereof.

Figure 3:
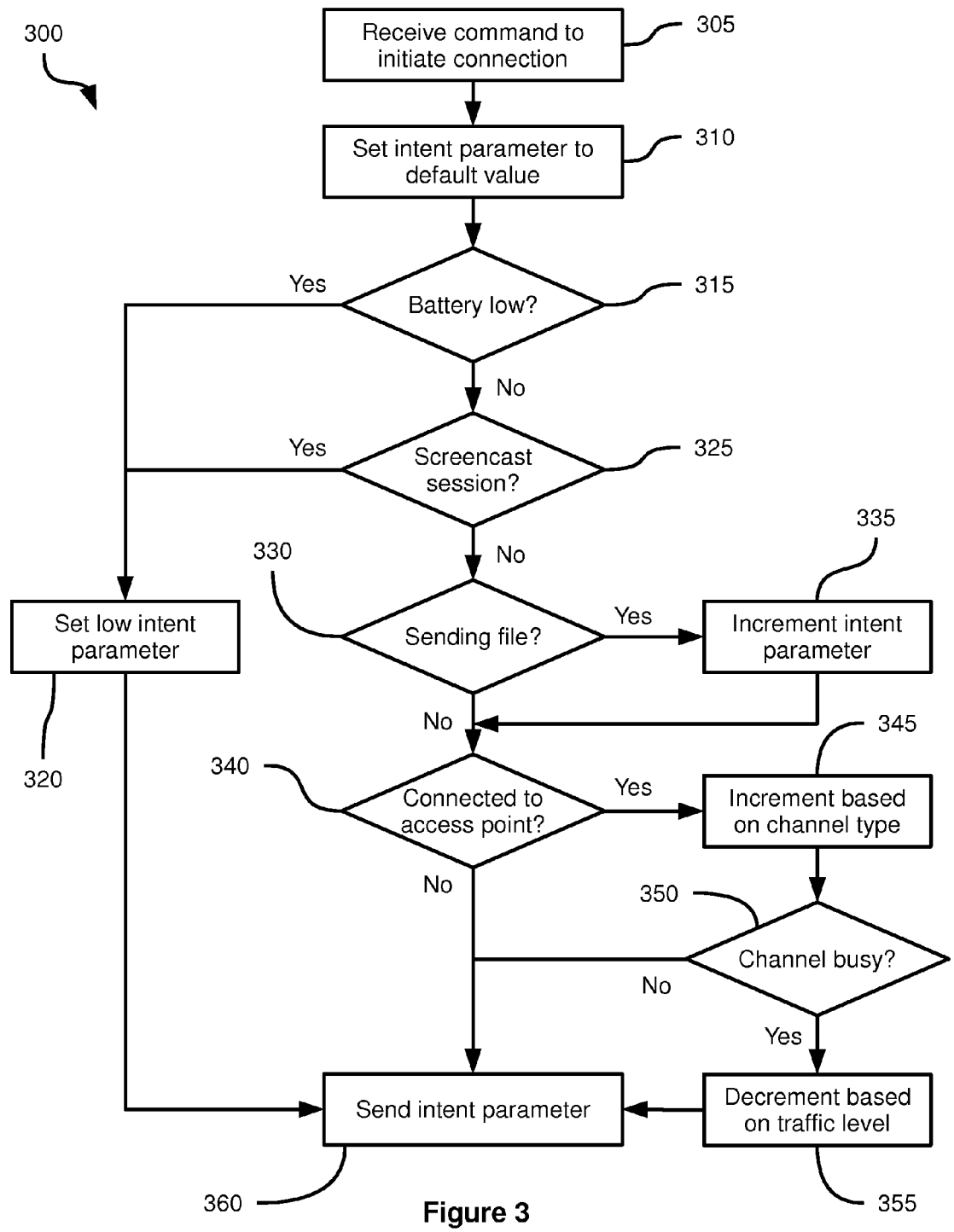
FIG. 3 depicts a method of generating and adjusting an intent parameter for the establishment of a wireless peer-to-peer connection in the system of FIG. 1, according to a non-limiting embodiment.

As mentioned above, communication device 104-1 is configured, via the execution of application 208 by processor 204, to establish a peer-to-peer wireless connection with communication device 104-2 over link 120. Turning to FIG. 3, a method 300 is illustrated for generating and adjusting an intent parameter for the establishment of the above-mentioned peer-to-peer connection. Method 300 will be described in conjunction with its performance in system 100, and particularly at communication device 104-1. However, method 300 may also be performed in variants to system 100 and device 104-1. In particular, as will become clear below, method 300 can also be performed at communication device 104-2, in some cases simultaneously with the performance of method 300 at communication device 104-1.

Beginning at block 305, communication device 104-1 (more specifically, processor 200 via the execution of application 208) is configured to receive a command to initiate a wireless peer-to-peer connection with communication device 104-2, such as a Wi-Fi Direct connection.

Figure 4:
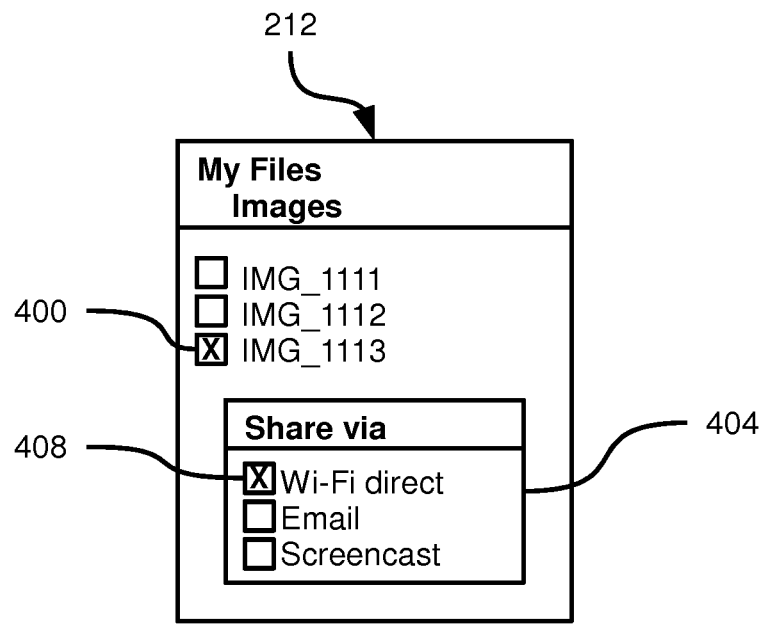
FIG. 4 depicts an interface presented on a display of the communications device of FIG. 2, according to a non-limiting embodiment.

The nature of the command received at block 305 is not particularly limited. For example, referring to FIG. 4, processor 200 can be configured to control display 212 to present an interface including a list of files (e.g. image files) stored in memory 204. In the present example, three files ("IMG_1111", "IMG_1112" and "IMG_1113") are listed on display 212. In response to receiving input data from touch input 216 representing selection of a check box or other selectable element 400 corresponding to the file "IMG_1113", processor 200 can be configured to present a "sharing" overlay 404 on display 212, containing selectable options for mechanisms by which to transmit the selected file to another communication device. For example, the options can include transmission of the selected file by email, by a peer-to-peer connection (e.g. Wi-Fi Direct), or by screencasting. The receipt at processor 200 of input data representing a selection of element 408, which corresponds to the Wi-Fi Direct option, is an example of a command received at block 305.

Other examples of commands received at block 305 are also contemplated. For example, the command received at block 305 can include the detection by processor 200 of communication device 104-2 in close physical proximity to communication device 104-1, for example by data received from a near-field communication (NFC) device connected to processor 200 and interacting with another NFC device within communication device 104-2. In still other examples, the command received at block 305 can be an invitation from communication device 104-2 to establish a connection. Such an invitation can be generated by communication device 104-2 in response to selections at communication device 104-2 similar to those discussed above and shown in FIG. 4. In general, block 305 can form part of what is termed the "discovery" stage of peer-to-peer connection establishment, in which communication devices 104-1 and 104-2 identify each other as parties for a connection. Following such discovery, the "negotiation" stage of connection establishment begins. As will be seen below, the negotiation stage includes the selection and adjustment of intent parameters to determine which device will act as the access point for the connection.

At block 310, having received a command to initiate a peer-to-peer connection, processor 200 is configured to set an intent parameter corresponding to communication device 104-1 to a default value and store the intent parameter in memory 204. As mentioned earlier, the intent parameter is a value indicating the suitability of communication device 104-1 to act as an access point for the peer-to-peer connection. In the present example, in which the peer-to-peer connection is implemented according to the Wi-Fi Direct standard, the intent parameter is the Wi-Fi Direct "Group Owner intent" or GO intent parameter, which is a whole number having a value from zero to fifteen. In other examples, a wide variety of intent parameters other than whole numbers between zero and fifteen may be employed.

In the present example, the default intent parameter set at block 310 is the value "7". Other defaults may also be employed. In general, the default value is selected to accommodate both negative and positive adjustments (in other words, it is preferred that the default value does not lie at either extreme of the available range of values for the intent parameter).

Having set the default value at block 310, processor 200 can be configured to perform block 315, at which processor 200 is configured to determine whether the remaining capacity of a battery powering the components of communication device 104-1 is below a predetermined threshold. In some embodiments, the determination at block 315 is not only whether the battery is low, but whether the battery is low and not charging (e.g. connected to a wall outlet). For example, at block 315 processor 200 may determine whether less than twenty percent of the battery's full charge remains. If the determination at block 315 is affirmative (that is, if the battery's remaining capacity falls below the threshold) then the performance of method 300 proceeds to block 320, at which the intent parameter set at block 310 is adjusted to a low value, and any further adjustments are bypassed. In the present example, the low value is zero, although the low value may have other values in other embodiments.

More generally, the low value is at or adjacent to the lower extreme of possible intent parameter values, to indicate low suitability of communication device 104-1 to act as an access point and thereby reduce or eliminate the likelihood of communication device 104-1 being selected as the access point. Acting as the access point in a wireless peer-to-peer connection can impose a greater computational burden and thus a greater power drain on communication devices, and thus it may be desirable to avoid acting as an access point when available power levels are low.

When the determination at block 315 is affirmative (i.e. the battery's level remains above the threshold, or communication device 104-1 is supplied with mains power, such as when the battery is charging), performance of method 300 proceeds to block 325. At block 325, processor 200 is configured to determine whether the command received at block 305 is associated with a screencasting session. As will be appreciated by those skilled in the art, screencasting includes the transmission of images corresponding to what is shown on display 212 to other devices. An example of a screencasting technology is the Miracast standard, which enables devices (such as communication device 104-1) to send screencast data to other devices over Wi-Fi Direct connections.

Processor 200 can perform the determination at block 325 by inspecting the command received at block 305 (the command can therefore be stored in memory 204, even if only temporarily). If the command indicates that the connection is to be initiated to establish a screencasting session (e.g. by selection of the "screencast" option shown in FIG. 4), the determination at block 325 is affirmative.

When the determination at block 325 is affirmative, the performance of method 300 proceeds to block 320, as described above. As will now be apparent to those skilled in the art, there are several potential reasons for setting the intent parameter low (e.g. to zero) when initiating a screencasting session. For example, screencasting sessions using standards such as Miracast are often established between devices such as communication device 104-1 and televisions. The access point in a peer-to-peer connection may request security data, such as a passcode, from the clients, and some televisions are not capable of providing such passcodes. Further, televisions are generally supplied by mains power, and are therefore better suited to bear the increased computational burden of acting as access points. Still further, some televisions are configured to assume that they will always be the access points in peer-to-peer connections, regardless of their intent parameters. Setting the intent parameter of communication device 104-1 to a low or zero value reduces or eliminates the likelihood of conflicts between communication device 104-1 and the television.

When the determination at block 325 is negative, performance of method 300 proceeds to block 330. At block 330, processor 200 is configured to determine whether the command received at block 305 includes an instruction to send a file from communication device 104-1 when the peer-to-peer connection is established. For example, the selection of elements 400 and 408 (as shown) in FIG. 4 indicates that the file "IMG_1113" is to be sent upon establishment of the peer-to-peer connection. The determination at block 330 is therefore affirmative in the present example.

Following the affirmative determination at block 330, processor 200, at block 335, increments the intent parameter set at block 310 to increase the suitability of communication device 104-1 to act as an access point. The nature of the increment is not particularly limited, and in the present example comprises an increase of one to the default value set at block 310. Thus, following the performance of block 335, the value of the intent parameter stored in memory 204 is eight.

Responsive to the performance of block 335 or a negative determination at block 330, processor 200 is configured to perform block 340. At block 340, processor 200 is configured to determine whether communication device 104-1 is connected to an access point, such as base station 112. In other words, processor 200 is configured to determine whether a link, such as link 116, has been established between network interface 224 and wireless base station 112. The determination at block 340 can be performed by sending a query from processor 200 to network interface 224. Network interface 224, in response to the query, can transmit data indicating which connections with other devices are currently active. From that data, processor 200 is configured to determine whether any links have been established with access points. More specifically, processor 200 is configured to determine whether any links have been established between communication device 104-1 and an access point using channels suitable for the peer-to-peer connection requested at block 305.

For example, communication device 104-1 may have established an active link to a mobile base station in network 108, using a 700 MHz channel, as well as link 116 with base station 112 using a 2.4 GHz channel. Processor 200 is configured at block 340 to detect only the presence of links using channels that are suitable for the peer-to-peer connection. In the present example, in which the peer-to-peer connection is a Wi-Fi Direct connection, the 700 MHz channel is not suitable for Wi-Fi Direct usage and is therefore ignored at block 340. However, the determination at block 340 is nevertheless affirmative due to the presence of link 116, which uses a 2.4 GHz channel that is suitable for Wi-Fi Direct.

When the determination at block 340 is affirmative, processor 200 is configured at block 345 to adjust the intent parameter set at block 310 (and potentially updated at block 335) based on the channel type of the link detected at block 340. An affirmative determination at block 340 indicates that communication device 104-1 is currently using a channel suitable for use in the peer-to-peer connection; causing network interface 224 to switch between channels to communicate over link 116 and link 120 can reduce the rate of data transmission over both links. Therefore, it is desirable for communication device 104-1 to be the access point for the peer-to-peer connection, which allows communication device 104-1 to control which channel is used for the peer-to-peer connection. Communication device 104-1, as the access point, can therefore select the same channel for use in the peer-to-peer connection as is already in use over link 116.

A variety of adjustments are contemplated at block 345. For example, processor 200 can apply different increments for different channel types. In the present example, processor 200 is configured to apply an increment of two to the intent parameter when link 116 uses the 2.4 GHz channel, and an increment of three to the intent parameter when link 116 uses the 5 GHz channel (which is generally subject to less interference than the 2.4 GHz channel, and therefore more desirable for use in the peer-to-peer connection). The specific channels mentioned above may be varied for other peer-to-peer connections not based on the Wi-Fi Direct standard.

Following the performance of block 345, processor 200 can be configured to perform block 350, at which processor 200 determines whether the channel of the connection detected at block 340 is congested (i.e. busy). As mentioned above, when a channel is already in use by communication device 104-1 that is suitable for use in the peer-to-peer connection, it is desirable to give control of the peer-to-peer connection to communication device 104-1, allowing communication device 104-1 to select the same channel for the peer-to-peer connection and avoid the need for network interface 224 to switch between two channels. However, when the channel already in use by communication device 104-1 is congested, it may be less desirable to use that channel for the peer-to-peer connection, even if using a different channel results in the need to switch between channels. Thus, when the channel detected at block 340 is busy, it is less desirable for communication device 104-1 to control the peer-to-peer connection as an access point.

The performance of block 350 by processor 200 includes obtaining congestion data associated with the channel over which an active connection was detected at block 340. Various mechanisms may be employed to obtain such congestion data. For example, processor 200 can be configured to request and receive a channel utilization parameter from a load element of base station 112 according to techniques known to those skilled in the art. The channel utilization parameter may be, for example, an indication of the percentage of time that the channel is busy, as sensed by base station 112.

In another example, processor 200 can be configured to request the known available admission capacity parameter from base station 112. In a further example, processor 200 can be configured to request an indication of the percentage of time the channel is busy from network interface 224 itself.

The determination at block 350 is affirmative if the congestion data referred to above exceeds a predetermined threshold. For example, a threshold of 80% may be stored in memory 204. Thus, when a channel utilization parameter received from base station 112 indicates that the channel utilization is at 85%, the determination at block 350 is affirmative, and the performance of method 300 proceeds to block 355.

At block 355, processor 200 is configured to adjust the intent parameter based on the congestion data received at block 350. For example, if the congestion data exceeds a predetermined threshold, processor 200 can be configured to decrement the intent parameter by a configurable amount. In the present example, at block 355 processor 200 is configured to decrement the intent parameter by two.

Following the performance of block 355, or the performance of block 320, or following a negative determination at block 340, processor 200 is configured to perform block 360. At block 360, the adjusted intent parameter is transmitted, via network interface 224, to communication device 104-2.

As will now be apparent to those skilled in the art, communication device 104-2 can also perform method 300, substantially simultaneously with the performance of method 300 by communication device 104-1. For example, the selection of element 408 at communication device 104-1 can initiate the performance of method 300 at communication device 104-1, and also cause processor 200 to send an invitation (via network interface 224) to communication device 104-2, which in response also performs method 300. Thus, both communication devices 104-1 and 104-2 generate and adjust their respective intent parameters. In order to establish the peer-to-peer connection, communication devices 104-1 and 104-2 exchange their intent parameters and compare the intent parameters to decide which device will be the access point in the peer-to-peer connection.

Figure 5:
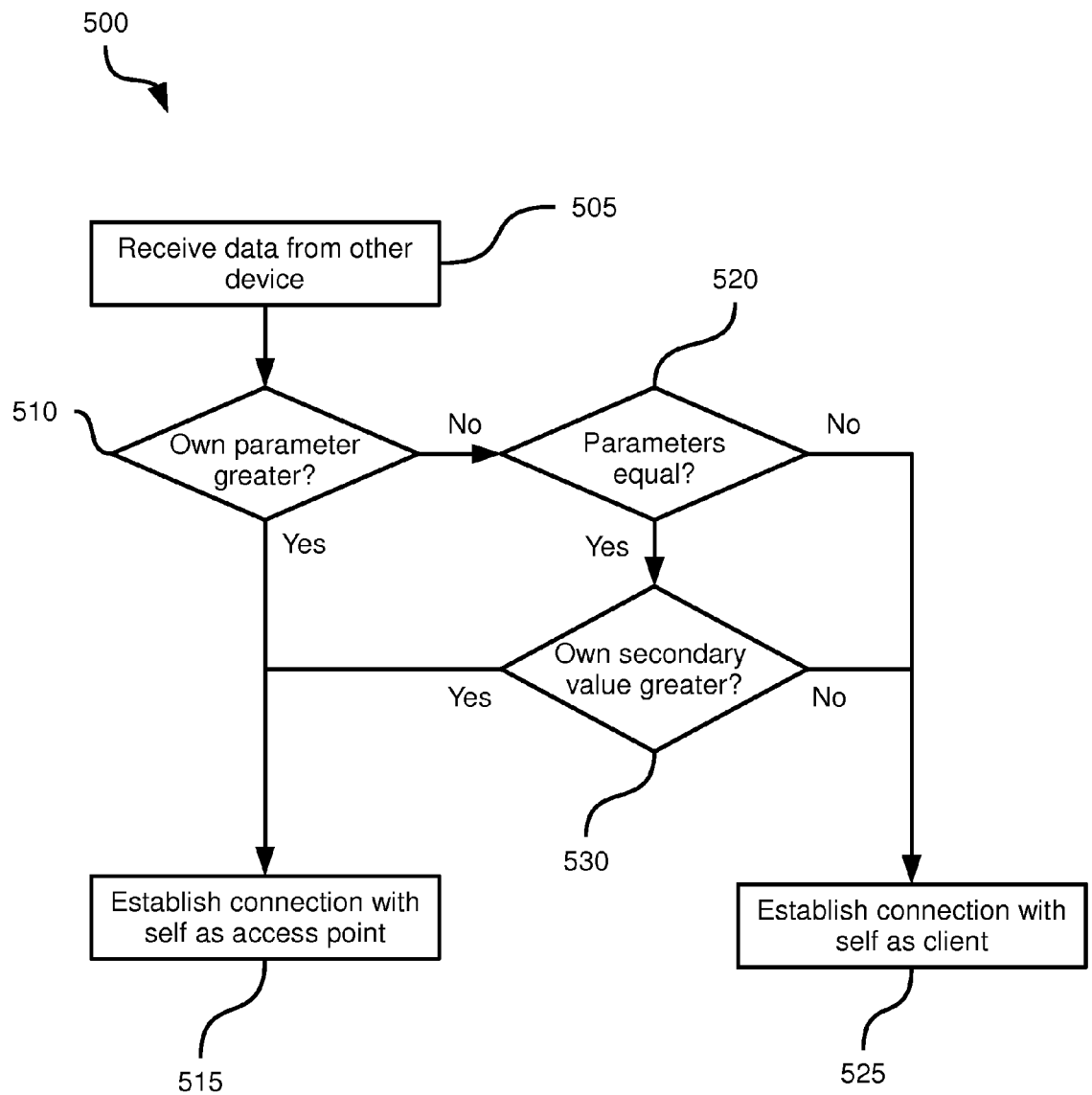
FIG. 5 depicts a method of establishing a wireless peer-to-peer connection using the results of the method of FIG. 3, according to a non-limiting embodiment.

Turning to FIG. 5, a method 500 of establishing a peer-to-peer connection using the results of method 300 is illustrated. Method 500 is also performed at both communication devices 104-1 and 104-2, although only the performance of communication device 104-1 will be described below.

At block 505, processor 200 is configured to receive data from communication device 104-2, including the intent parameter of communication device 104-2. At block 510, processor 200 is configured to determine whether the intent parameter corresponding to communication device 104-1 is greater than the intent parameter received from communication device 104-2. In the present example, assuming the link 116 is not busy and uses the 2.4 GHz channel, the intent parameter generated by computing device 104-1 is ten (a default of seven, plus one at block 335, plus another two at block 345). The intent parameter generated by communication device 104-1, on the other hand, is seven (a default of seven, with no adjustments because communication device 104-2 is not attempting to send a file and is not connected to base station 112).

In some embodiments based on the Wi-Fi Direct standard, the determination at block 510 can include a determination of whether the intent parameter of communication device 104-1 is equal to a maximum value. For example, communication device 104-1 can determine at block 510 whether its intent parameter is equal to fifteen (the maximum permissible value according to the Wi-Fi Direct standard). If that determination is affirmative, then performance of method 500 can proceed to block 515 regardless of whether the intent parameter received from communication device 104-2 is equal to the intent parameter to communication device 104-1. In other embodiments, however, the determination at block 510 can evaluate only whether the intent parameter of communication device 104-1 is greater than the parameter received at block 505. In those embodiments, if both parameters are equal to the maximum value, the performance of method 500 proceeds to block 520 because neither parameter is greater than the other.

The determination at block 510 in the present example is therefore affirmative, and computing device 104-1 proceeds to block 515. At block 515, processor 200 is configured to establish the peer-to-peer connection with communication device 104-1 as the access point. This may be accomplished through known mechanisms. For example, communication device 104-1 can be configured to implement security requirements for the peer-to-peer connection, select a channel, and transmit the security requirements, channel selection and various other data for establishing the connection to communication device 104-2.

If the determination at block 510 is negative, however, processor 200 instead performs block 520. At block 520, processor 200 is configured to determine whether the intent parameters corresponding to devices 104-1 and 104-2 are equal. A determination that the intent parameters are not equal indicates that the intent parameter corresponding to communication device 104-1 is smaller than the intent parameter corresponding to communication device 104-2. Thus, proceeding to block 525, processor 200 is configured to establish the peer-to-peer connection with communication device 104-1 as a client device. The performance of block 525 can include, for example, awaiting data specifying security requirements and channel selection from the access point (in this case, communication device 104-2).

When the determination at block 520 is affirmative, processor 200 performs block 530 of method 300. At block 530, processor 200 is configured to determine whether a secondary intent value corresponding to communication device 104-1 is greater than a secondary intent value corresponding to communication device 104-2. The secondary values mentioned above can be randomly selected values accompanying the data received at block 505. Each device 104-1 and 104-2 can select a random secondary value, which may, for example, be a single bit appended to the intent parameters.

When the determination at block 530 is affirmative (that is, the secondary value corresponding to device 104-1 is greater than the secondary value corresponding to device 104-2), processor 200 is configured to perform block 515. Otherwise, processor 200 is configured to perform block 525.

Thus, as seen above, communication devices 104-1 and 104-2 are configured to generate and adjust respective intent parameters for use in establishing a peer-to-peer connection. The intent parameters reflect the usage scenarios of each device, and can increase the likelihood that a device with a suitable channel already active—so long as that channel is not overly congested—will be assigned as the access point for the peer-to-peer connection.

Variations to the above are contemplated. For example, in some embodiments, one or more of blocks 315, 325 and 330 can be omitted. In addition, block 330, when performed, can be performed after blocks 340, 345, 350 and 355 rather than before. In a further variation, the order in which blocks 315 and 325 are performed can be reversed.

In still further variations, rather than bypassing all further adjustments following a negative determination at block 315, a low battery level can result instead in a negative adjustment to the intent parameter, similar to a busy channel determination at block 350.

The adjustments to intent parameters mentioned above may be predetermined and unchanging, or they may be configurable. In either event, the adjustments can be stored in memory 204, in association with the conditions under which each adjustment is to be applied. For example, the adjustments can be stored in memory 204 in a table as seen below.

TABLE 1

Example Intent Parameter Adjustments

| Data | Condition | Adjustment |
| --- | --- | --- |
| Battery level | <20% | set to 0 |
| Screencast | =yes | set to 0 |
| File transmit | =yes | +1 |
| Suitable channel active | =yes; 2.4 GHz | +2 |
| Suitable channel active | =yes; 5 GHz | +3 |
| Channel utilization | >80% | −2 |
| Channel utilization | >50% | −1 |
| Channel utilization | <10% | +1 |

In Table 1 above, each item of "data" is an input to method 300, obtained by processor 200. For example, the battery level is obtained by processor 200 at block 315, and the condition (the battery level being below 20% of its maximum) indicates when the determination at block 315 is affirmative. As also seen in Table 1, multiple criteria may be employed for a single item of data. For example, at block 350 processor 200 may be configured to make three determinations: whether the channel utilization is greater than 80%, whether the channel utilization is greater than 50%, and whether the channel utilization is smaller than 10%. Each determination, if affirmative, results in a separate adjustment to the intent parameter. Similar multi-level adjustments can be applied to other data (such as battery level).

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:

1. A communication device, comprising:
    a network interface;
    a memory;
    a processor interconnected with the network interface and the memory; and,
    a battery supplying power to each of the processor, the memory and the network interface, the processor configured to:
        receive a command to initiate a wireless peer-to-peer connection with a second communication device;
        set an intent parameter corresponding to the communication device to a default value, and store the intent parameter in the memory;
        determine whether a link has been established between the network interface and a wireless base station;
        when a link has been established, adjust the intent parameter based on a channel type of the link;
        receive a second intent parameter corresponding to the second communication device via the network interface;
        determine whether the intent parameter is greater than the second intent parameter;
        when the determination is affirmative, configure the communication device as an access point for the peer-to-peer connection;
        when the determination is negative, configure the communication device as a client for the peer-to-peer connection; and,
        prior to determining whether a link has been established between the network interface and a wireless base station;
        determine whether a remaining capacity of the battery is below a predetermined threshold; and
        when the remaining capacity is below the predetermined threshold, set the intent parameter to a minimal value and bypassing the determination of whether a link has been established between the network interface and a wireless base station.

2. The communication device of claim 1, the processor further configured to determine whether a link has been established by determining whether a link has been established using a channel suitable for the peer-to-peer connection.

3. The communication device of claim 1, the processor further configured to adjust the intent parameter by incrementing the intent parameter by a first amount for a first channel type, and by a second amount for a second channel type.

4. The communication device of claim 1, the processor further configured, when a link has been established, to determine whether the link is congested.

5. The communication device of claim 4, the processor further configured to determine whether the link is congested by obtaining a channel utilization from the base station and comparing the channel utilization to a predetermined threshold.

6. The communication device of claim 4, the processor further configured, when the link is congested, to decrement the intent parameter.

7. The communication device of claim 1, the processor further configured, prior to determining whether the intent parameter is greater than the second intent parameter, to send the intent parameter to the second communication device.

8. The communication device of claim 1, the processor further configured, prior to determining whether the intent parameter is greater than the second intent parameter, to increment the intent parameter when the command includes a command to transmit a file to the second communication device.

9. A method in a computing device having a network interface, a memory and a processor, the method comprising:
    receiving, at the processor, a command to initiate a wireless peer-to-peer connection with a second communication device;
    set an intent parameter corresponding to the communication device to a default value, and store the intent parameter in the memory;
    determine, at the processor, whether a link has been established between the network interface and a wireless base station;
    when a link has been established, adjust the intent parameter in the memory based on a channel type of the link;
    receive, at the processor, a second intent parameter corresponding to the second communication device via the network interface;
    determine, at the processor, whether the intent parameter is greater than the second intent parameter;
    when the determination is affirmative, configure the communication device as an access point for the peer-to-peer connection;
    when the determination is negative, configure the communication device as a client for the peer-to-peer connection; and,
        prior to determining whether a link has been established between the network interface and a wireless base station;

determining whether a remaining capacity of a battery supplying power to the processor, the memory and the network interface is below a predetermined threshold; and when the remaining capacity is below the predetermined threshold, setting the intent parameter to a minimal value and bypassing the determination of whether a link has been established between the network interface and a wireless base station.

10. The method of claim 9, wherein determining whether a link has been established comprises determining whether a link has been established using a channel suitable for the peer-to-peer connection.

11. The method of claim 9, wherein adjusting the intent parameter comprises incrementing the intent parameter by a first amount for a first channel type, and by a second amount for a second channel type.

12. The method of claim 9, further comprising: when a link has been established, determining, at the processor, whether the link is congested.

13. The method of claim 12, wherein determining whether the link is congested comprises obtaining a channel utilization from the base station and comparing the channel utilization to a predetermined threshold.

14. The method of claim 12, further comprising, when the link is congested, decrementing the intent parameter.

15. The method of claim 9, further comprising, prior to determining whether the intent parameter is greater than the second intent parameter, sending the intent parameter to the second communication device.

16. The method of claim 9, further comprising, prior to determining whether the intent parameter is greater than the second intent parameter, incrementing the intent parameter when the command includes a command to transmit a file to the second communication device.

17. A non-transitory computer readable medium storing a computer program executable by a processor of a communication device having a memory and a network interface interconnected with the processor, wherein execution of the computer program is for:

receiving, at the processor, a command to initiate a wireless peer-to-peer connection with a second communication device;

set on intent parameter corresponding to the communication device to a default value, and store the intent parameter in the memory;

determine, at the processor, whether a link has been established between the network interface and a wireless base station;

when a link has been established, adjust the intent parameter in the memory based on a channel type of the link;

receive, at the processor, a second intent parameter corresponding to the second communication device via the network interface;

determine, at the processor, whether the intent parameter is greater than the second intent parameter;

when the determination is affirmative, configure the communication device as an access point for the peer-to-peer connection;

when the determination is negative, configure the communication device as a client for the peer-to-peer connection; and, prior to determining whether a link has been established between the network interface and a wireless base station:

determining whether a remaining capacity of a battery supplying power to the processor, the memory and the network interface is below a predetermined threshold; and when the remaining capacity is below the predetermined threshold, setting the intent parameter to a minimal value and bypassing the determination of whether a link has been established between the network interface and a wireless base station.

* * * * *